US006801361B2

(12) United States Patent
Aoki et al.

(10) Patent No.: US 6,801,361 B2
(45) Date of Patent: Oct. 5, 2004

(54) SUN TRACKING LIGHTING DEVICE

(75) Inventors: Hideaki Aoki, Kyoto (JP); Kenji Taguchi, Hirakata (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 10/380,463

(22) PCT Filed: Sep. 20, 2001

(86) PCT No.: PCT/JP01/08214

§ 371 (c)(1),
(2), (4) Date: Jul. 22, 2003

(87) PCT Pub. No.: WO02/25031

PCT Pub. Date: Mar. 28, 2002

(65) Prior Publication Data

US 2004/0100698 A1 May 27, 2004

(30) Foreign Application Priority Data

Sep. 20, 2000 (JP) ....................................... 2000-184818
Sep. 20, 2000 (JP) ....................................... 2000-284828
Sep. 20, 2000 (JP) ....................................... 2000-284841
Mar. 5, 2001 (JP) ....................................... 2001-059770

(51) Int. Cl.[7] ................................................ G03B 17/00
(52) U.S. Cl. ....................................................... 359/597
(58) Field of Search ................................ 359/591, 592, 359/593, 596, 597

(56) References Cited

U.S. PATENT DOCUMENTS 5,493,824 A * 2/1996 Webster et al. ............... 52/200
5,999,323 A * 12/1999 Wood ......................... 359/591
6,433,932 B1 * 8/2002 Aoki et al. ................. 359/597
6,493,145 B1 * 12/2002 Aoki et al. ................. 359/597

FOREIGN PATENT DOCUMENTS

JP 8-115609 5/1996
JP 9-4159 1/1997
JP 2000-75237 3/2000

* cited by examiner

*Primary Examiner*—Christopher Mahoney
(74) *Attorney, Agent, or Firm*—Armstrong, Kratz, Quintos, Hanson & Brooks, LLP

(57) ABSTRACT

The invention provides a light admitting device of the sun tracking type which has a solar cell as mounted on light reflecting means for tracking the sun. This arrangement assures the solar cell of an improved power generation efficiency without making the device greater in size and more complex. The device comprises a dome (20) made of a light transmitting material, light reflecting means (30) covered with the dome (20) and rotatably supported within the dome (20), drive means (60) coupled to the light reflecting means (30) for rotating the light reflecting means (30) to orient this means (30) toward the direction of the sun, rechargeable power source means (43) electrically connected to the drive means (60) for supplying electric power to the drive means (60), and a solar cell panel (40) electrically connected to the power source means (43) for charging the power source means (43). The solar cell panel (40) is disposed within the dome (20) so as to be rotatable with the light reflecting means (30).

23 Claims, 11 Drawing Sheets

SUN TRACKING LIGHTING DEVICE

FIELD OF THE INVENTION

The present invention relates to light admitting devices of the sun tracking type, and more particularly to a light admitting device of the type mentioned which has mounted thereon a solar cell panel for charging the power source for driving light reflecting means.

BACKGROUND ART

Light admitting devices are adapted for use with a skylight bore having an opening in the roof of a building and extending to the ceiling for admitting sunlight into the interior of the building where sunlight is not available. The device has light reflecting means, which is provided at the upper end of the skylight bore for reflecting sunlight into the interior through the bore.

Light admitting devices of the sun tracking type are known (as disclosed, for example, in U.S. Pat. No. 5,999,323) which comprise light reflecting means directed toward the sun and made rotatable to track the sun so as to achieve an improved light admission efficiency since the sun changes in direction with time.

With the light admitting device of the sun tracking type, the light reflecting means is rotated by a motor as a drive source. The motor is so controlled that the reflecting means is thereby rotated to track the sun during the daylight hours from sunrise till sunset, and is further rotated after sunset and directed toward the position of sunrise on the next day to complete one turn of rotation.

Power source means available for the motor include a commercial power source and secondary cell which is rechargeable by a solar cell, whereas the commercial power source requires interior wiring and is cumbersome to install. Power source means which are rechargeable by the solar cell are therefore desirable.

However, the conventional light admitting device has the problem that the solar cell panel can not always be fully exposed to sunlight depending on the position of the sun to exhibit a reduced power generation efficiency, because the solar cell panel, which needs to be electrically connected to the motor, is attached to a mount frame to which the motor is fixed. Thus, there is a need to use a solar cell panel of increased size to compensate for insufficient power generation.

At sunrise or sunset or during winter, the sun is at a low altitude, and sunlight is therefore incident on the light admitting device at a low angle. At this time, the sunlight is almost entirely reflected from the front side of the light reflecting means which is closer to the sun, consequently permitting light to enter the skylight bore at one portion only.

Many members including a mount rod, bracket and motor are provided under the light reflecting means. Accordingly, the sunlight reflected from the light reflecting means is blocked by these members, failing to reach the skylight bore effectively and entailing the problem of a lower light admission efficiency.

The light admitting device has angle detecting means such as a potentiometer for detecting the angle of rotation of the light reflecting means. The angle detecting means must be installed accurately in position with respect to angle. However, since the orientation of the skylight bore differs with the direction toward which the building faces, it is conventional practice to orient the reflecting means and the potentiometer in the same direction as the skylight bore first and to thereafter install the device. Consequently, it is difficult to adjust the orientation after installation.

An object of the present invention is to provide a light admitting device of the sun tracking type wherein a solar cell is mounted on the same support member as the light reflecting means which tracks the sun to thereby enable the solar cell to achieve an improved power generation efficiency without making the device greater in size and complex.

Another object of the invention is to provide a light admitting device of the sun tracking type which is adapted to admit a sufficient quantity of light at sunrise or sunset or during winter when the sun is at a low altitude.

Still another object of the invention is to provide a light admitting device of the sun tracking type wherein means for detecting the angle of the light reflecting means can be adjusted in conformity with the orientation of the skylight bore at the time of installation.

DISCLOSURE OF THE INVENTION

The present invention provides a light admitting device 10 of the sun tracking type which comprises a dome 20 made of a light transmitting material, light reflecting means 30 rotatably supported within the dome 20 for reflecting sunlight, drive means 60 coupled to the light reflecting means 30 for orienting the light reflecting means 30 toward the direction of the sun by rotation, rechargeable power source means 43 electrically connected to the drive means 60 for supplying electric power to the drive means 60, and a solar cell panel 40 electrically connected to the power source means 43 for charging the power source means 43, wherein the solar cell panel 40 is disposed within the dome 20 so as to be rotatable with the light reflecting means 30. Since the solar cell panel 40 rotates with the slight reflecting means 30 moving to track the sun, the solar cell panel 40 can be exposed to sunlight with an improved efficiency to achieve a higher power generation efficiency. The solar cell panel 40 requires no drive unit for controlling the orientation and can therefore be compacted and made lightweight. Since the solar cell panel 40 is disposed within the dome 20, the means for ensuring water-tightness for the panel 40 can be dispensed with.

Preferably, the drive means 60 has a hollow rotating shaft 66, and wiring 46 for electrically connecting the solar cell panel 40 to the power source means 43 extends through the rotating shaft 66, the light reflecting means 30 being connected to one end of the rotating shaft 66. The solar cell panel 40 is electrically connected to the power source means 43 by the wiring 46 extending through the rotating shaft 66. The wiring 46 is accordingly unlikely to become caught, for example, by the light reflecting means 30, which in turn is rotatable free of any interference. The wiring 46, which is enclosed in the rotating shaft 66, will not deteriorate owing to exposure to sunlight.

Preferably, the drive means 60 is provided at the top of the dome 20, and the light reflecting means 30 is suspended from and supported by the rotating shaft 66 of the drive means 60. With the light reflecting means 30 supported in suspension, the drive torque required for rotating the reflecting means 30 can be diminished. This reduces the power consumption of the drive means 60, serving to render the power source means 43 and the solar cell panel 40 compact and lightweight.

Preferably, the drive means 60 rotates the light reflecting means 30 to orient the reflecting means 30 toward the direction of the sun during the daylight hours and reversely rotates the reflecting means 30 after sunset to move the reflecting means 30 to the position of sunrise of the following day.

Instead of rotating the reflecting means 30 one turn a day, the reflecting means 30 is reversely rotated and moved after sunset to the position of sunrise of the next day. This obviates the likelihood that the wiring electrically connecting the solar cell panel 40 to the power source means 43 will be twisted.

Preferably, the light admitting device 10 of the sun tracking type according to the invention comprises a casing 50*a* fixedly provided within the dome 20 and housing the drive means 60 and the power source means 43 therein, the drive means 60 and the power source means 43 being made rotatable together within the casing 50*a* to constitute a control unit 51, the light reflecting means 30 and the solar cell panel 40 being coupled to the control unit 51 and rotatable with the control unit 51. The drive means 60 and the power source means 43 are made rotatable together as a control unit, and the control unit 51 and the solar cell panel 40 are made rotatable together. This eliminates the need to provide wiring between the rotatable assembly and the fixed assembly. Consequently, the electric wiring is unlikely to become entangled even if the light reflecting means 30 is rotated more than one turn in the same direction. In the case where the reflecting means 30 is to be moved to the sunrise position of the following day after the reflecting means 30 has been rotated to track the sun from sunrise till sunset, the angle of rotation from the position of sunset to the position of sunrise of the following day is measured. The reflecting means 30 can then be moved toward the direction in which the angle of rotation is smaller. This ensures a reasonable operation in conformity with the daylight hours to realize a reduction in power consumption, also making the device economically usable for the nights with a midnight sun at districts of high latitude.

The light reflecting means 30 comprises a plurality of reflective panels 31, 32, 33 arranged at a predetermined spacing, with the adjacent panels opposed to each other face-to-face, and the reflective panel 31 disposed forward and closer to the sun has a lower end positioned at a higher level than lower ends of the reflective panels 32, 33 toward the rear. The lower end of the forward reflective panel 31 closer to the sun is positioned at a higher level than those of the rearward reflective panels 32, 33. When sunlight ingresses at a small angle, this arrangement not only causes the sunlight to enter a skylight bore 90 on reflection from the forward panel 31 but also permits a portion of the sunlight to directly enter the skylight bore 90. The arrangement thus obviates the likelihood that the light will ingress into the bore 90 unevenly at one location only, assuring a satisfactory light admission efficiency at sunrise or sunset or in winter when the sun is at a low altitude.

Preferably, the forward reflective panel 31 has an upper end positioned at a lower level than upper ends of the rearward reflective panels 32, 33. The upper end of the forward reflective panel 31 closer to the sun is positioned at a lower level than those of the rearward reflective panels 32, 33, so that when sunlight ingresses at a small angle, the sunlight impinges not only on the forward panel 31 but also on the rearward panels 32, 33. As a result, a sufficient amount of sunlight can be admitted into the skylight bore to achieve a satisfactory light admission efficiency even at sunrise or sunset or in winter when the sun is at a low altitude.

Preferably, the reflective panels 31, 32, 33 are arranged as inclined with respect to a horizontal plane, and the forward reflective panel 31 has a smaller inclination θ than the rearward reflective panels 32, 33. Since the forward reflective panel 31 closer to the sun is more inclined than the rearward reflective panels 32, 33, the portion of sunlight ingressing at a small angle can be reflected at an angle close to a right angle so as to guide a large amount of light into the skylight bore.

The present invention further provides a light admitting device of the sun tracking type comprising a dome 20 made of a light transmitting material, drive means 60 disposed at a top portion of the dome 20, and light reflecting means 30 suspended from and supported by the drive means 60 for reflecting sunlight, the light reflecting means 30 being rotatable by the drive means 60 so as to be oriented toward the direction of the sun, wherein the drive means 60 has a rotating shaft 66 rotatable by a motor 62 and supporting the light reflecting means 30 as suspended from a lower end thereof, the rotating shaft 66 being provided at an upper portion thereof with a board 70 adjustable in angle and fixable within a plane perpendicular to the axis of the rotating shaft 66, the board 70 being provided at an approximate center thereof with angle detecting means 72 engageable with an upper end of the rotating shaft 66. The angle detecting means 72 is provided on the board 70 which is adjustable in angle and can be fixed within a horizontal plane (i.e., within a plane perpendicular to the rotating shaft of the light reflecting means), so that after the device 10 has been installed, the angle at which the board 70 is to be mounted is adjusted in conformity with the angle at which the skylight bore is formed, for the fine adjustment of the angle detecting means 72. For this reason, accurate angle adjustment need not be performed before the installation of the light admitting device 10. Since the angle detecting means 72 is finely adjustable by rotating the board 70, the detecting means 72 can be oriented accurately, whereby an improved sunlight admission efficiency can be attained.

Preferably, the angle detecting means 72 is connected to the rotating shaft 66 by a coupling 80 slidable in directions perpendicular to the axis of the rotating shaft 66. Even if the axis of the angle detecting means 72 and the axis of the rotating shaft 66 are somewhat out of alignment when the board 70 is rotated for angle adjustment, the detecting means can therefore be coupled to the rotating shaft 66 to ensure angle detection.

BEST MODE OF CARRYING OUT THE INVENTION

Figure 1:
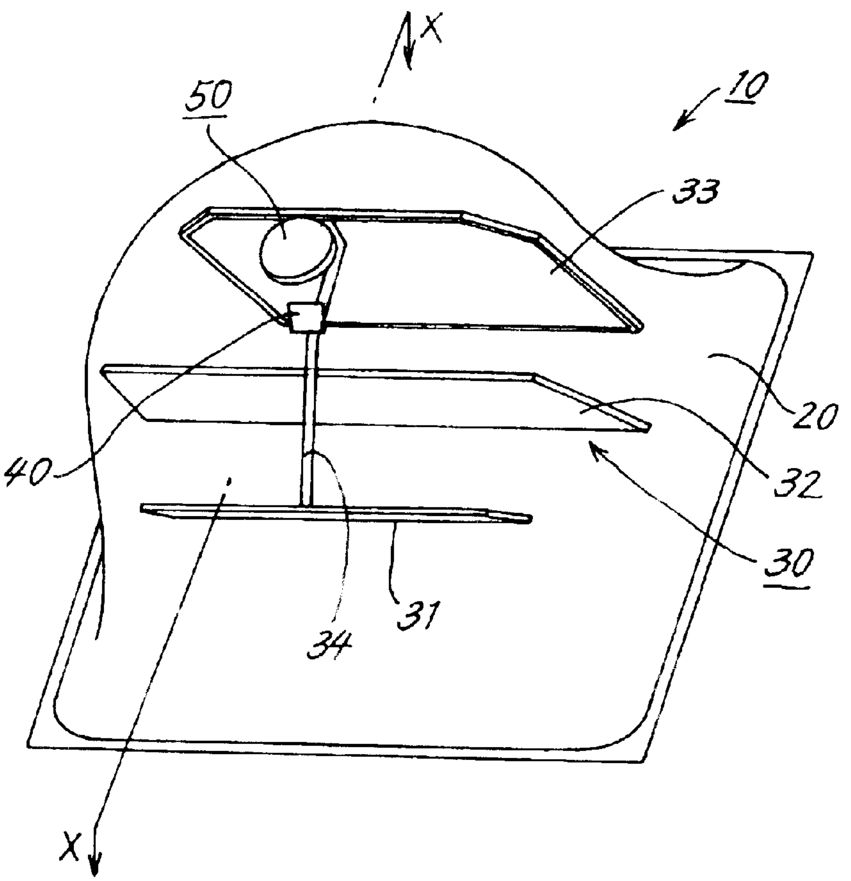
FIG. 1 is a perspective view of a light admitting device of the sun tracking type of the invention.
Figure 2:
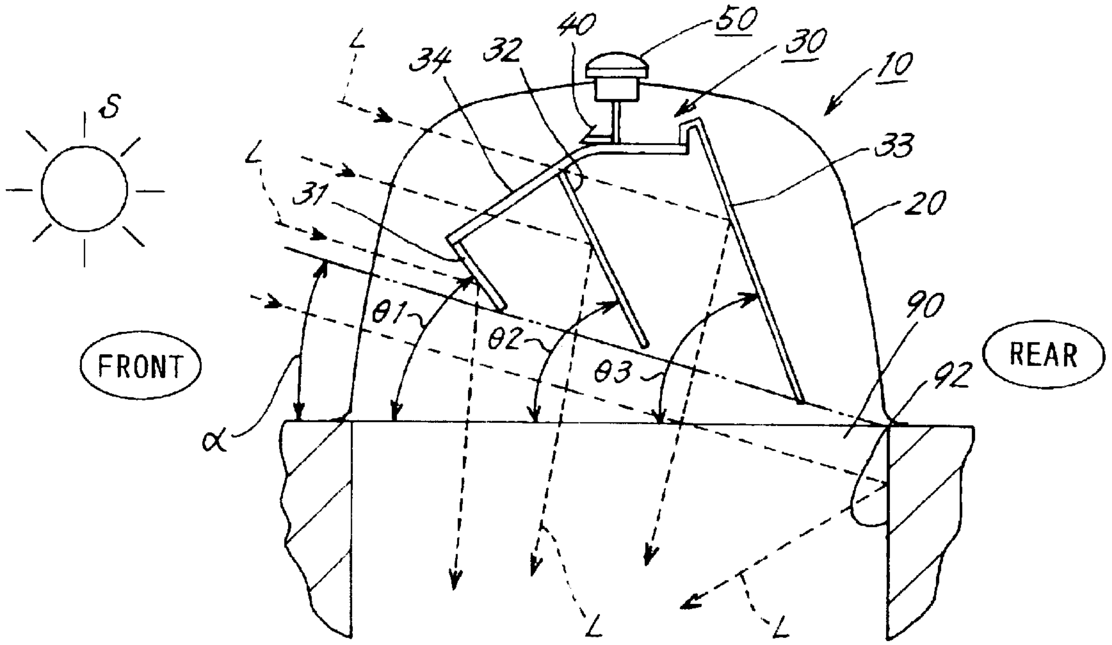
FIG. 2 is a view in section taken along the line X—X in FIG. 1 and showing the device while it is admitting light when the sun is at a low altitude.
Figure 3:
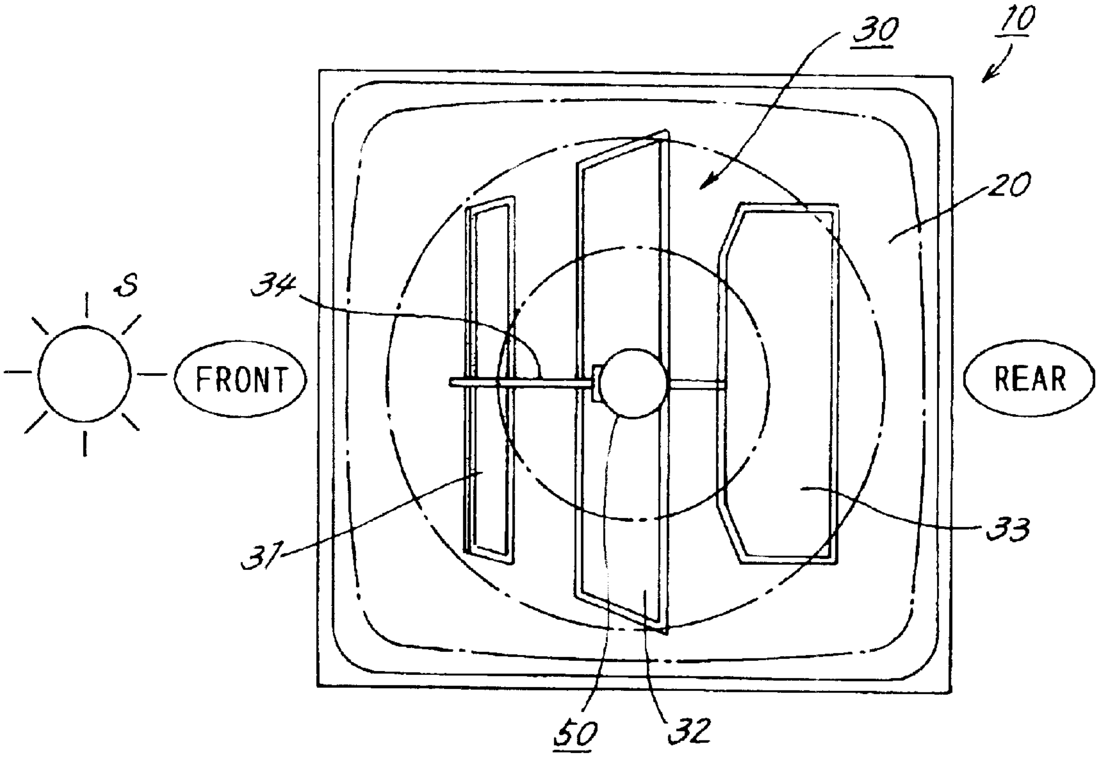
FIG. 3 is a plan view of the light admitting device of the invention.

FIGS. 1 to 3 show a light admitting device 10 of the sun tracking type. Although the light admitting device to be described below is of such type that the device has light reflecting means 30 suspended therefrom, the present invention is not limited to this type but can of course be applied to light admitting devices of the resting type having light reflecting means to be supported at its lower portion.

For a better understanding, the direction toward the sun S will be referred to as "front," and the opposite side as "rear" as shown in FIGS. 2 and 3.

The light admitting device 10 of the sun tracking type is installed at the upper end of a skylight bore 90 extending from the roof of a building through the ceiling thereof as seen in FIG. 2.

The skylight bore 90 has at its upper end an opening formed in a roof portion of the building. The bore 90 is generally in the form of a square measuring about 120 cm in the length of one side, and is oriented in a direction which changes with the size, structure of the building or room, direction the building or room faces, required amount of light and like conditions.

An inner wall 92 defining the skylight bore 90 has a mirrored surface so as to guide the light reflected by the device 10 efficiently into an interior space. Provided at the lower end (at the interior ceiling side) of the bore 10 is a transparent interior diffusion plate (not shown) for diffusing the light admitted into the interior space.

With reference to FIGS. 1 to 3, the sun tracking light admitting device 10 comprises a dome 20 mounted over the upper end of the skylight bore 90 and made of transparent material, light reflecting means 30 disposed within the dome and supported in suspension by the dome, and a control box 50 for rotating the reflecting means 30 to cause the means to track the sun. These components will be described below in detail.

Dome 20

As shown in FIGS. 1 to 4, the dome 20 is a transparent or translucent cover for protecting the light reflecting means 30 from wind, rain, dust, etc. and preventing these from ingressing into the interior. The dome 20 can be formed, for example, from an acrylic resin plate, polycarbonate resin plate or the like having a thickness of about 3 to about 5 mm or by working a hard glass, hard plastic or the like. The illustrated dome 20 is prepared from acrylic resin and has a generally semispherical central portion and a peripheral edge portion which is square in conformity with the shape of the skylight bore 90. The dome 20 is not limited to the semispherical shape but can be in any of various shapes such as square or rectangular shape and conical or pyramidal shape, and may be reinforced with a frame when so required.

Figure 4:
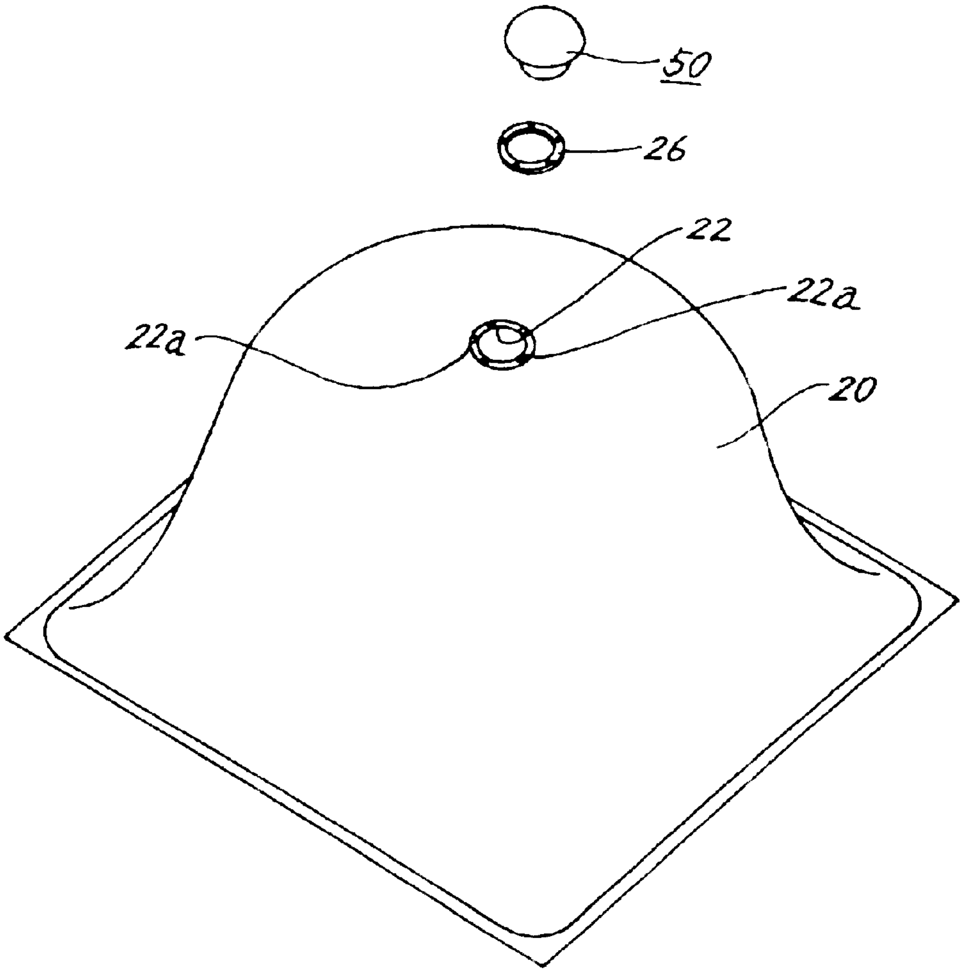
FIG. 4 is a diagram showing how to assemble a dome and a control box.

Formed in the top of the dome 20 centrally thereof is a mount hole 22 for attaching the control box 50 to the dome as shown in FIG. 4. The dome 20 has screw bores 22*a* equidistantly spaced apart around the mount hole 22 for use in fastening the control box 50 with screws.

Light Reflecting Means 30

The light reflecting means 30 comprises a plurality of reflective panels 31, 32, 33 attached to a support frame 34 and is disposed inside the dome 20 and supported thereby in suspension.

Figure 5:
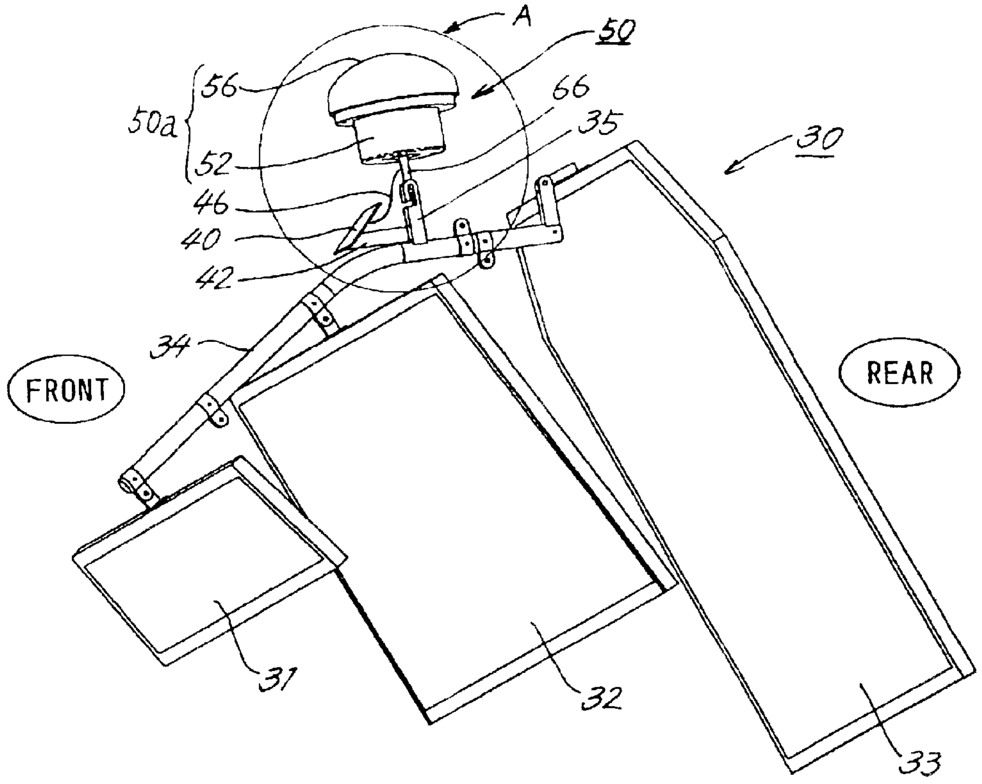
FIG. 5 is a perspective view of light reflecting means and the control box.

As shown in FIGS. 2 and 5, the support frame 34 is in the form of a bar inclined downward toward the front (toward the sun S) and has a suspending hook 35 projecting upward from a portion thereof slightly rearward from its midportion. The support frame 34 is provided with the three reflective panels 31, 32, 33.

Each of the reflective panels 31, 32, 33 is a mirror for reflecting rays of the sun and is prepared, for example, by affixing to a lightweight styrene resin plate a resin film having a mirror surface formed by vacuum evaporation of aluminum. The reflective panels 31, 32, 33 are arranged as supported by the front end, middle portion and rear end of the support frame 34, with their panel surfaces opposed to one other. It is desired that the panels except for the rearmost panel 33 be mirror-finished not only on the front surface but also on the rear surface so that even when the light reflected from the rearward panel impinges on the rear surface of the forward panel, the can be guided into the light admitting bore 90.

In order to achieve a high light admitting efficiency even when the sun is at a low altitude, it is desired that the reflective panels 31, 32, 33 be made indifferent sizes and attached at different angles as seen in FIG. 5.

Stated more specifically with reference to FIGS. 2, 3 and 5, the front reflective panel 31 is smaller than the other panels in both height and width, while the middle reflective panel 32 is greater than the rear panel 33 in width although smaller than this panel 33 in height.

As shown in FIGS. 2 and 5, the reflective panels 31, 32, 33 as arranged from the front rearward have their lower ends positioned at progressively lowering levels. According to the illustrated embodiment, a phantom line through the lower ends of the panels 31, 32, 33 makes an angle a of 16.7° with a horizontal. Conversely, the upper ends of the panels 31, 32, 33 attached to the support frame 34 are positioned at lower levels toward the front. The angle a of the phantom line through the lower ends of the panels 31, 32, 33 is preferably in the range of $10° \leqq a \leqq 20°$.

Since the reflective panels 31, 32, 33 have varying heights, the area of the rearward panel to be shadowed by the forward panel when exposed to sunlight from the front is diminished. The panels 31, 32, 33 can therefore be made small-sized and given a higher efficiency. The middle reflective panel 32 can be given an increased width in conformity with the diameter of the semispherical dome 20.

Because the levels of the upper ends and lower ends of the reflective panels 31, 32, 33 are defined as described above, the area of the rearward panel to be shadowed by the forward panel can be diminished, and sunlight can be guided directly into the skylight bore 90 when the sun is at a low altitude as shown in FIG. 2.

The panels 31, 32, 33 have respective angles of inclination $\theta 1$, $\theta 2$ and $\theta 3$ which decrease from panel to panel toward the front. Thus it is desired that the panels be attached so as to incline forward ($\theta 1 < \theta 2 < \theta 3$). With the illustrated embodiment, these angles $\theta 1$, $\theta 2$, $\theta 3$ as shown in this order from the front rearward are 55°, 65°, 70°, respectively.

Figure 6:
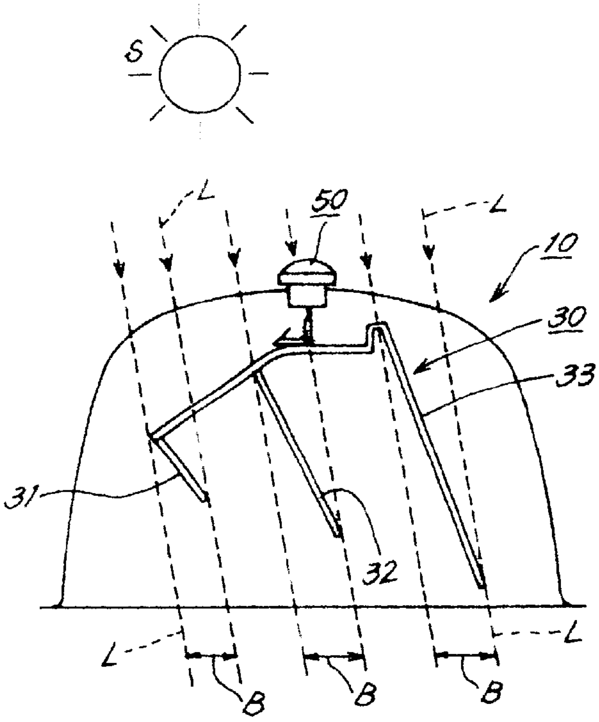
FIG. 6 is a view in section taken along the line X—X in FIG. 1 and showing the device while it is admitting light when the sun is at a high altitude.

The angles at which the reflective panels 31, 32, 33 are attached are determined as above, so that a large amount of sunlight can be reflected downward especially by the front panel 31 to achieve a high light admission efficiency when the sun is at a low altitude at sunrise and sunset. When the sun is at a high altitude in summer, sunlight L is blocked (as at B in FIG. 6) by the panels 31, 32, 33 to diminish the quantity of sunlight admitted into the skylight bore as shown in FIG. 6, thus restricting ingress of an excess of light into the interior.

Figure 7:
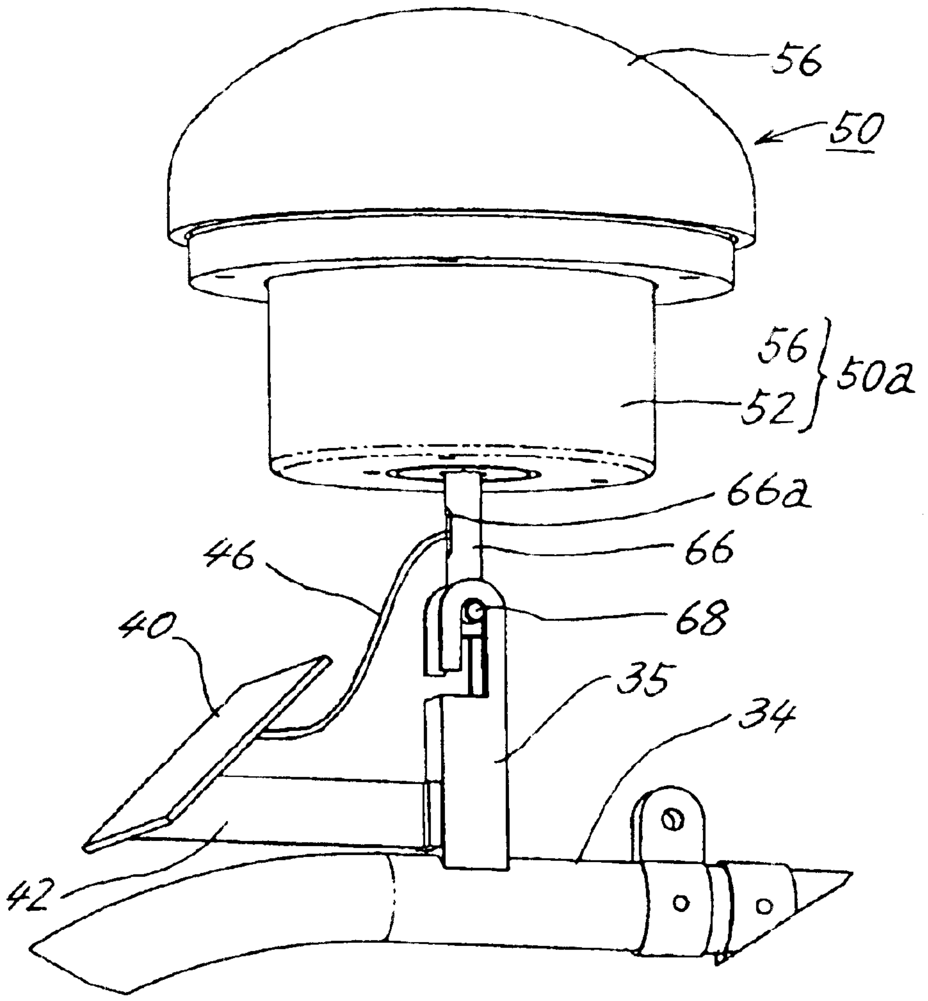
FIG. 7 is an enlarged perspective view of the portion surrounded by a circle A in FIG. 5.

Further as shown in FIGS. 5 and 7, the support frame 34 is provided with a solar cell panel 40 for charging power source means 43 for supplying power to drive means 60 for rotating the light reflecting means 30 and control means 74. A solar cell support frame 42 extends forward from the hook 35, and the solar cell panel 40 facing obliquely upward is attached to the front end of the frame 42. The frame 42 may alternatively be attached to the rotating shaft 66 to be described later.

The solar cell panel 40 is attached to its frame 42 so as to be rotatable with the support frame 34 for the light reflecting means 30 and is therefore adapted to track the sun with the reflecting means 30 and to generate electricity with a high efficiency during the daylight hours.

As shown in FIG. 7, the solar cell panel 40 has connected thereto wiring 46, which extends through the rotating shaft 66 of the drive means 60 and is electrically connected to the power source means 43.

Control Box 50

Figure 9:
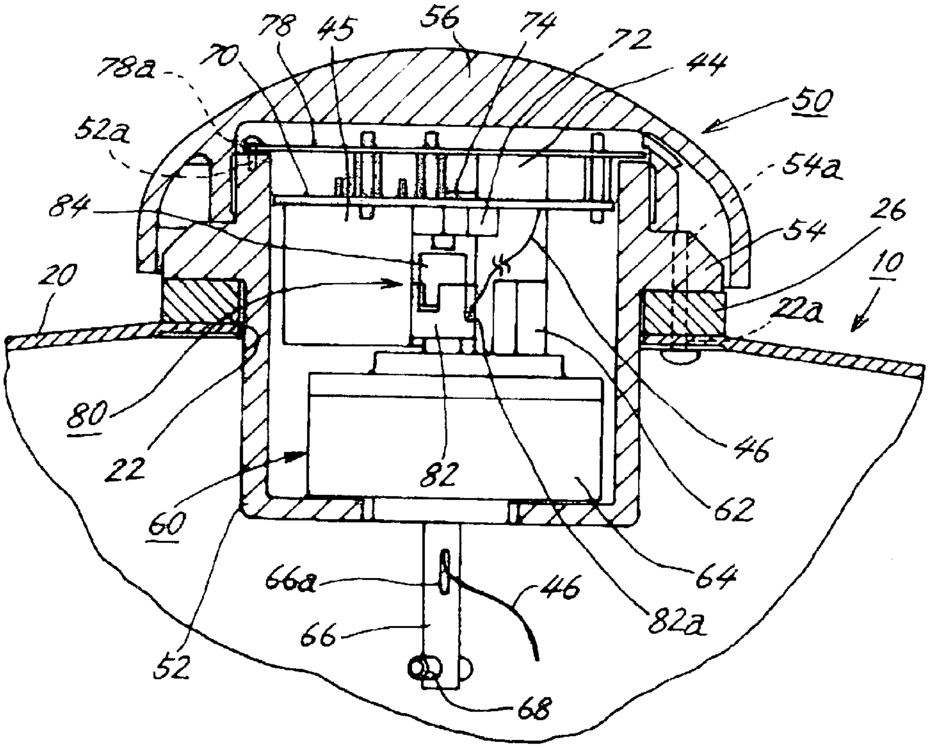
FIG. 9 is a view in section of the control box as mounted on the dome.

As shown in FIGS. 2, 4 and 9, the control box 50 is fitted in the mount hole 22 in the top of the dome 20, supporting the support frame 34 of the light reflecting means 30 in suspension as seen in FIGS. 5 and 7.

Figure 8:
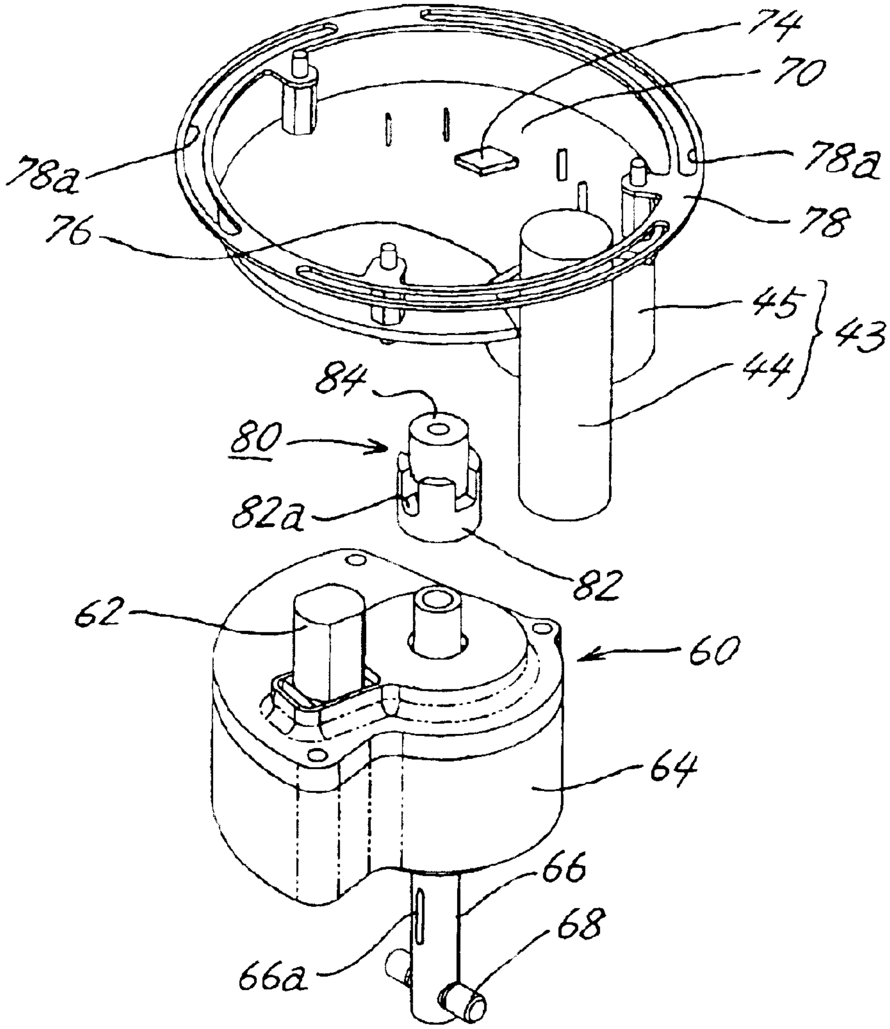
FIG. 8 is an exploded perspective view of drive means, board, etc. provided in the control box.

The control box 50 comprises a casing **50*a* housing therein the drive means 60, a circuit board 70, the power source means 43, etc. shown in FIGS. 8 and 9**.

The casing **50*a* comprises a casing body 52 in the form of a cylinder having a bottom, and a closure 56 as seen in FIG. 9**.

The casing body 52 is provided in its upper end with screw bores **52*a* equidistantly spaced apart for use in fixing the circuit board 70 to be described later. The upper end of the casing body 52 is externally threaded and has a flange 54 below the threaded portion. Screw holes 54*a* are formed in the flange 54 in opposed relation with the screw bores 22*a* formed in the dome 20 around the mount hole 22**.

The closure 56 is internally threaded for screw-thread engagement with the casing body 52 and has an outer edge extending outward as if covering the flange 54, closing an upper opening of the casing body 52.

A gear box 64 providing the drive means 60 is disposed inside the casing body 52.

A motor 62 is coupled to the rotating shaft 66 by the gear box 64 with use of a reduction gear mechanism (not shown).

The shaft 66 is hollow, and the wiring 46 extends therethrough for electrically connecting the solar cell panel 40 to the power source means 43. One end of the wiring 46 extends outward from a side wall of a coupling 80 (to be described later) disposed at the upper end of the shaft 66 and is connected to the power source means 43. The other end of the wiring 46 is led out of a wiring outlet **66*a* formed in the shaft 66 in the vicinity of the lower end thereof, and connected to the solar cell panel 40. The wiring 46 extends through the shaft 66** internally thereof, is therefore not exposed to sunlight and can be prevented from deteriorating.

The rotating shaft 66 is provided at its lower end with a suspension pin 68 perpendicular to the shaft axis. The pin 68 has engaged therewith the hook 35 projecting from the support frame 34 of the light reflecting means 30 for supporting the reflecting means 30 in suspension.

The circuit board 70 is generally in the form of a disk and has angle detecting means 72 on its bottom surface centrally thereof. The board 70 further has mounted thereon the control means 74 required for controlling the drive means 60, etc.

The board 70 is further provided with the power source means 43 which is rechargeable for supplying electric power to the drive means 60, control means 74, etc. As shown in FIG. 8, a secondary cell 44 and a capacitor 45 are used as the power source means 43 according to the present embodiment. The secondary cell 44 serves as the power source for the control means 74, and the capacitor 45 as the power source for the motor 62. The power source means 43 may consist only of one of the cell 44 and the capacitor 45. The secondary cell 44 may be used as the power source for the motor 62, and the capacity 45 as the power source for the control means 74. Usable as the capacitor 45 is, for example, a capacitor of great capacity (supercapacitor).

According to the illustrated embodiment, the secondary cell 44 is fitted in a cutout 76 formed in the outer periphery of the board 70, and the capacitor 45 is attached to the lower surface of the board 70.

An annular board holder 78 for holding the board 70 is attached to the board 70. Circular-arc slots **78*a* arranged at equal spacings are formed in the holder 78**.

Figure 10:
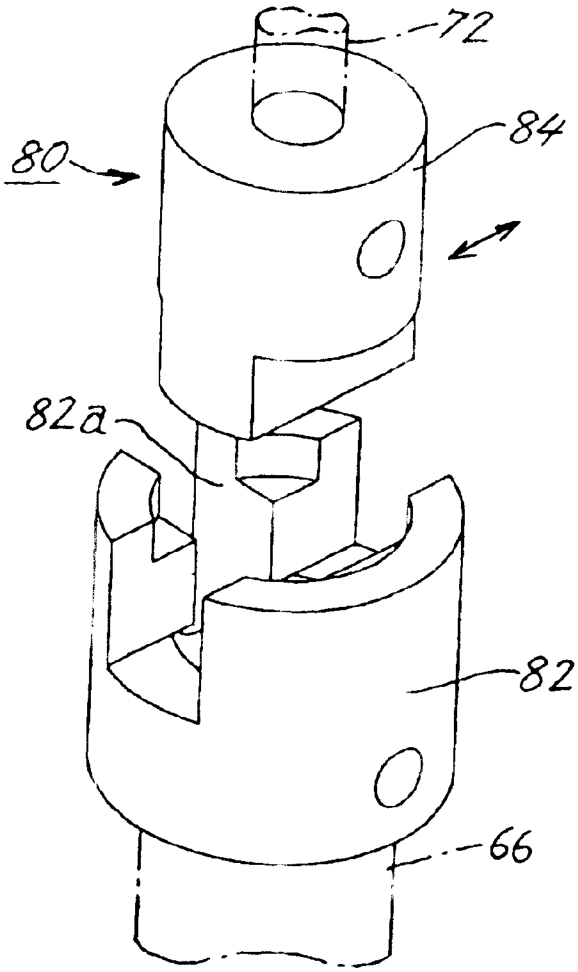
FIG. 10 is a perspective view of a coupling.

For example, a potentiometer varying in resistance value with the angle of rotation is usable as the angle detecting means 72 to be provided on the board 70. As shown in FIGS. 8 to 10, the angle detecting means 72 is connected to the rotating shaft 66 by the coupling 80, and the result of detection is sent to the control means 74.

As shown in FIG. 10, the coupling 80 comprises a receiving member 82 fixed to the upper end of the rotating shaft 66, and an engaging member 84 slidable in directions perpendicular to the shaft 66 (directions indicated by arrows in the drawing). The engaging member 84 is fixed to the angle detecting means 72.

The receiving member 82 has a recess **82*a* through which the wiring 46 extending through the shaft 66** is led sideways.

The secondary cell 44, which is fitted in the cutout 76 of the board 70 as aforementioned, is electrically connected to the control means 74 to supply electric power to the control means 74, electrically connected to the solar cell panel 40 by the wiring 46 and charged during the daylight hours.

The capacitor 45 is electrically connected to the motor 62 to supply power to the motor 62, electrically connected to the solar cell panel 40 by the wiring 46 and charged during the daylight hours.

Assembling the Light Admitting Device 10

The component assemblies of the sun tracking light admitting device 10 thus constructed, i.e., the dome 20, light reflecting means 30 and control box 50, are carried to the rooftop of the building, and can further be assembled at the rooftop. Some or all of the following steps can be performed on the ground.

Step of Preparation for Installation of the Device 10

While the angle detecting means 72 attached to the board 70 of the control box 50 is connected to the rotating shaft 66 by the coupling 80, the board holder 78 is temporarily held to the casing body 52 with screws using the slots **78*a* and screw bores 52*a* so as to be adjustable in position relative to the body 52 toward directions of rotation. The closure 56** is held in a state not closed completely or held removed.

An annular water-tight seal 26 is adhered in advance to the top wall of the dome 20 around the mount hole 22.

The light reflecting means 30 is assembled on the ground in advance.

Step of Mounting the Control Box 50 on the Dome 20

First, the casing body 52 is inserted into the mount hole 22 of the dome 20, and positioned in place by rotation so as to orient the angle detecting means 72 in the substantially desired direction. The flange 54 is fastened to the dome 20 with screws, with the seal 26 held therebetween and with the screw bores **22*a* and holes 54*a*** matched in position. At this time, an adhesive or the like may be used to ensure an improved water-tight effect.

The control box 50 is mounted on the dome 20 by the above procedure.

Step of Attaching the Reflecting Means 30

The hook 35 of the light reflecting means 30 is engaged with the suspension pin 68 on the rotating shaft 66 projecting downward from the control box 50. The wiring 46 is connected to the solar cell panel 40 in this state.

Step of Mounting the Dome 20 on Roof Bored Portion 90

The dome 20 is mounted on the roof portion around the upper-end opening of the skylight bore 90. The dome 20 is fixed to the roof portion around the skylight bore 90 by adhesion or fastening with screws, with a suitable rubber packing or water-tight seal provided at the joint between the dome 20 and the bored roof portion 90 to ensure water-tightness.

Adjustment of the Angle Detecting Means 72

Since the board 70 is temporarily held to the casing body 52, the board 70 is rotated relative to the casing body 52 in this state to orient the angle detecting means 72 toward the specified direction. At this time, the light reflecting means 30 and the rotating shaft 66 may be oriented in any direction.

Unless the axis of the angle detecting means 72 is in alignment with the axis of the rotating shaft 66, the board 70 will be difficult to rotate, whereas the angle detecting means 72 is connected to the shaft 66 by the coupling 80 according to the invention. The board 70 is therefore rotatable even if the connection involves some misalignment.

The board 70 is fastened to the casing body 52 by tightening up the screws concerned after the orientation of the angle detecting means 72 has been adjusted.

Data Input

After the board 70 has been fastened in place, data such as the latitude and longitude of the place of installation, date, time, etc. is entered into the control means 74 using an external input unit.

Attaching the Closure 56

After inputting the data, the closure 56 is fitted to the casing body 52 and fastened thereto by screwing, whereby the light admitting device 10 is completely assembled and installed.

Description of Operation

The control means 74 drives the drive means 60 in accordance with the location of installation of the light admitting device 10 of the sun tracking type, based on the input data and the orientation of the light reflecting means 30 detected by the angle detecting means 72.

Stated more specifically, sunlight is guided into the interior by rotating the light reflecting means 30 and causing the reflecting means 30 to track the sun during the daylight hours from sunrise until sunset. Instead of driving the motor 62 continuously during the daylight hours, the motor may be driven for only several seconds at a predetermined interval, for example, at an interval of ten minutes, to intermittently rotate the light reflecting means 30.

During the daylight hours, the solar cell panel 40 is exposed to sunlight for power generation and charges the power source means 43. Since the wiring 46 connecting the solar cell panel 40 to the power source means 43 extends through the rotating shaft 66, reflecting means 30 is rotatable free of interference at this time.

When the sun is at a low altitude during winter or at sunrise or sunset, sunlight L irradiates the light admitting device 10 at a low angle as shown in FIG. 2. Since a phantom line extending through the lower ends of the reflective panels 31, 32, 33 of the reflecting means 30 and as directed toward the sun (toward the front) is inclined at an angle a, a portion of the sunlight L directly enters the skylight bore 90 without impinging on the reflective panels. The portion of sunlight impinging on the front panel 31 is reflected therefrom approximately vertically downward into the skylight bore 90 since the panel 31 is inclined at an angle of θ1. As a result, an improved light admission efficiency is achieved, affording a sufficient amount of light to the interior of the building.

When the sun is at a high altitude, i.e., during daytime, especially during daytime in summer, sunlight L irradiates the admitting device 10 nearly from thereabove as seen in FIG. 6. If the light is admitted efficiently in this case, an excessive amount of light will enter the interior through the skylight bore 90. With the reflective panels 31, 32, 33 arranged at the respective angles θ according to the invention, the sunlight L is blocked (as indicated at B in FIG. 6) by the panels 31, 32, 33, which prevent ingress of an excess of light into the interior.

After sunset, the motor 62 is reversely driven to rotate the reflecting means 30 to the sunrise position of the following day. The same procedure as described above is then repeated. The reverse rotation will not twist the wiring 46. In the case where the capacitor 45 is used as the power source means 43 for the motor 62, it is desirable to reversely rotate the motor immediately after sunset or as soon as possible thereafter to suppress a reduction in capacity due to self-discharge. Even if the capacitor 62 discharges after the reverse rotation, the solar cell panel 40 is exposed to sunlight after sunrise on the following day to charge the capacitor for the supply of power to the motor 62.

Another Embodiment of Control Box

Figure 11:
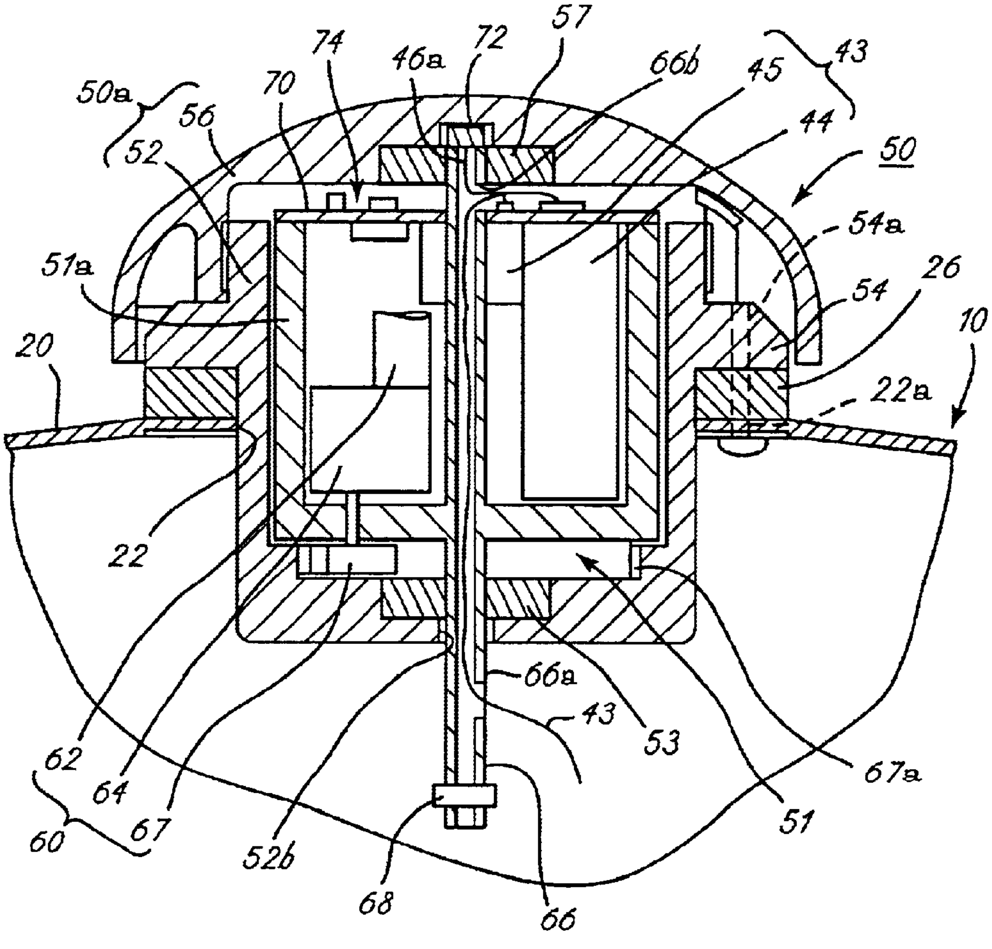
FIG. 11 is a view in section of another embodiment of control box.

FIG. 11 shows another embodiment of control box 50.

The control box 50 shown in FIG. 11 comprises a cylindrical casing 50*a* mounted on the top of the dome 20 around the mount hole 22 therein, and a control unit 51 rotatably disposed inside the casing 50*a*.

The casing 50*a* comprises a casing body 52 in the form of a cylinder having a bottom, and a closure 56 for closing an upper opening of the casing body 52.

The casing body 52 has an upper end portion externally threaded and adapted for screw-thread engagement with the closure 56, and a flange 54 projecting outward from a portion thereof below the threaded portion. Screw holes 54*a* are formed in the flange 54 in opposed relation with the screw bores 22*a* formed in the dome 20 around the mount hole 22. The flange 54 is fastened to the dome 20 by screws, with a seal 26 interposed therebetween. The casing body 52 is provided at a portion of its inner periphery with an inner gear 67*a* meshing with a gear 67 of the control unit 51 to be described later. The casing body 52 further has a cavity formed in its bottom wall centrally thereof. A rotating shaft 66 of the control unit 51 is loosely inserted through a shaft bore 52*b* extending through the bottom wall centrally of the cavity. A bearing 53 rotatably supporting the shaft 66 is fitted in the cavity.

The closure 56 is internally threaded for screw-thread engagement with the casing body 52 and has an outer edge extending outward as if covering the flange 54 to close the upper opening of the casing 52. The closure 56 is internally provided with a cavity centrally thereof. Installed in the cavity is a bearing 57 for rotatably supporting the rotating shaft 66 of the control unit 51.

The control unit 51 shown in FIG. 11 is housed in the casing body 52.

The control unit 51 comprises drive means 60, power source means 43 and control means 74 for performing all control operations of the light admitting device 10, these means being arranged inside a housing 51*a* in the form of a cylinder having a bottom.

The rotating shaft 66, which is hollow, vertically extends through the housing 51*a* centrally thereof. The shaft 66 is rotatably supported by bearings 53, 57 provided on the casing 52. The shaft 66 has a lower portion extending downward from the shaft bore 52*b* in the casing 52 and is provided at its lower end with a horizontal suspension pin 68 for supporting the light reflecting means 30 in suspension. The shaft 66 is further provided, in the vicinity of its upper and lower ends, with respective holes 66*b*, 66*a* in communication with a hollow portion of the shaft 66. Wiring 46 for interconnecting the solar cell panel 40 and power source means 43 to be described below extends through these shaft holes.

As shown in FIG. 11, provided inside the housing 51*a* is the drive means 60 which comprises a motor 62, gear box 64 having a reduction gear mechanism and the gear 67 which is coupled to the gear mechanism. The gear 67 is provided as projected downward from the bottom wall of the housing 51*a* and meshes with the inner gear 67*a* on the casing body 52.

Further provided in the housing 51*a* is the power source means 43 for the light admitting device 10. According to the present embodiment, the power source means 43 comprises a capacitor 45 having a great capacity and serving as a power source for the drive means 60, and a secondary cell 44 serving as a power source for the control means 74. The power source 43 is electrically connected to the solar cell panel 40 to be described later and is charged by the panel 40.

A circuit board 70 providing the control means 74 for controlling the light admitting device 10 is disposed at the upper end of the housing 51*a*. The circuit board 70 has mounted thereon a CPU, various circuits, memory, etc. and has electrically connected thereto the foregoing drive means 60 and power source means 43, and the angle detecting means 72 to be described below.

Disposed at the upper end of the rotating shaft 66 is means 72 for detecting the angle of rotation of the control unit 51 to cause the light reflecting means 30 to track the sun. A potentiometer is used as the angle detecting means 72 according to the illustrated embodiment for detecting the angle of rotation of the shaft 66 relative to the closure 56. Electric wiring 46*a* for the detecting means 72 extends through the upper end of the shaft 66 and then through a hollow portion thereof and is led out of the upper hole 66*b* in the shaft 66 and connected to the circuit board 70.

The light admitting device 10 described has no wiring between the rotatable assembly and the fixed assembly, so that all wiring is rotatable with the housing 51*a*. The light reflecting means 30 of the device 10 can therefore be rotated more than one turn in the same direction. The reflecting means 30 is of course rotatable reversely by reversely driving the motor 62.

In the case where the reflecting means 30 is to be moved to the sunrise position of the following day after the reflecting means 30 has been rotated to track the sun from sunrise until sunset, the angle between the orientation of the reflecting means 30 at the sunset and the orientation of the sunrise on the following day is measured, and the reflecting means 30 is moved toward the direction in which the distance of movement is shorter. This ensures a reduction in power consumption, also making the device economically usable for the nights with a midnight sun at districts of high latitude.

The embodiments have been described above for the description of the present invention and are not intended to restrict the invention as defined in the appended claims or reduce the scope thereof. The device of the invention can be modified variously within the technical scope defined in the claims.

For example, the number, shape, construction, angle of installation, etc. of the reflective panels are not limited to those of the embodiments. Although the light reflecting means 30 is supported as suspended from the top of the dome 20 according to the foregoing embodiments, the reflecting means can be installed as supported on a mount portion.

INDUSTRIAL APPLICABILITY

The light admitting device of the sun tracking type of the invention has a solar cell as mounted on light reflecting means for tracking the sun. This assures the solar cell of an improved power generation efficiency without making the device greater in size and more complex.

The device of the invention further ensures satisfactory admission of light even when the sun is at a low altitude as at sunrise or sunset or during winter.

Furthermore according to the invention, the means for detecting the angle of the light reflecting means is adjustable in conformity with the orientation of the skylight bore when the device is installed.

What is claimed is:

1. A light admitting device of the sun tracking type comprising:

a dome (20) made of a light transmitting material, a support frame (34) disposed within the dome and operative to rotate in response to movement of the sun, light reflecting means (30) supported by the support means within the dome (20) for reflecting sunlight, drive means (60) suspendingly coupling the support frame (34) for orienting the light reflecting means (30) toward the direction of the sun by rotation of the support frame (34)

rechargeable power source means (43) electrically connected to the drive means (60) for supplying electric power to the drive means (60), a solar cell panel (40) electrically connected to the power source means (43) for charging the power source means (43), and the solar cell panel (40) is on the support frame (34) disposed fixedly within the dome (20) so as to be rotatable with the light reflecting means (30).

2. The light admitting device of the sun tracking type according to claim 1 wherein the drive means (60) comprises a hollow rotating shaft (66), wiring (46) electrically connecting the solar cell panel (40) to the power source means (43) and extending through the rotating shaft (66), and the support frame (34) mounting the light reflecting means (30) being connected to one end of the rotating shaft (66).

3. The light admitting device of the sun tracking type according to claim 2 wherein the drive means (60) is provided at a top portion of the dome (20), and the light reflecting means (30) is suspended from and supported by the rotating shaft (66) of the drive means (60).

4. The light admitting device of the sun tracking type according to any one of claims 1 or 2 or 3 wherein the drive means (60) rotates the support frame (34) to orient the reflecting means (30) toward the direction of the sun during the daylight hours and reversely rotates the support frame (34) after sunset to move the reflecting means (30) to a position of sunrise of the following day.

5. The light admitting device of the sun tracking type according to claim 1 which comprises a casing (50*a*) fixed to the dome (20) and housing the drive means (60) and the power source means (43) therein, the drive means (60) and the power source means (43) being connected to rotate together within the casing (50*a*) to constitute a control unit (51), the support frame (34) mounting light reflecting means (30) and the solar cell panel (40) being coupled to the control unit (51) and being rotatable therein.

6. The light admitting device of the sun tracking type according to claim 5 wherein the casing (50*a*) is provided with an inner gear (67*a*) formed on an inner periphery thereof, and the drive means (60) has a gear (67) meshing with the inner gear (67*a*), the control unit (51) being rotatable with the light reflecting means (30) and the solar cell panel (40) by rotating the gear (67) by the drive means (60).

7. The light admitting device of the sun tracking type according to claim 5 or 6 wherein the casing (50*a*) is provided at a top portion of the dome (20), and the light reflecting means (30) is suspended from and supported by the control unit (51).

8. The light admitting device of the sun tracking type according to claim 1 wherein the light reflecting means (30) comprises a plurality of reflective panels (31),(32),(33) arranged at a predetermined spacing, with the adjacent panels opposed to each other face-to-face, and the reflective panel (31) disposed forward and closer to the sun has a lower end positioned at a higher level than lower ends of the reflective panels (32), (33) toward the rear.

9. The light admitting device of the sun tracking type according to claim 8 wherein the forward reflective panel (31) has an upper end positioned at a lower level than upper ends of the rearward reflective panels (32), (33).

10. The light admitting device of the sun tracking type according to claim 8 or 9 wherein the reflective panels (31), (32), (33) are arranged as inclined with respect to a horizontal plane, and the forward reflective panel (31) has a smaller inclination θ than the rearward reflective panels (32), (33).

11. The light admitting device of the sun tracking type according to claim 10 wherein the drive means (60) is provided at a top portion of the dome (20), and the support frame (34) mounting the light reflecting means (30) is suspended from and supported by a rotating shaft (66) of the drive means (60).

12. The light admitting device of the sun tracking type according to claim 1 wherein the drive means (60) is rotatable by a motor (62) and has a rotating shaft (66) suspendedly supporting the support frame (34) mounting the light reflecting means (30) from a lower end of the rotating shaft (66), the rotating shaft (66) being provided at an upper portion thereof with an angularly adjustable board (70) which is fixable within a plane perpendicular to the axis of the rotating shaft (66), the board (70) being provided at an approximate center thereof with angle detecting means (72) engageable with an upper end of the rotating shaft (66).

13. The light admitting device of the sun tracking type according to claim 12 wherein the angle detecting means (72) is connected to the rotating shaft (66) by a coupling (80) slidable in directions perpendicular to the axis of the rotating shaft (66).

14. The light admitting device of the sun tracking type according to claim 12 or 13 wherein the angle detecting means (72) is a potentiometer.

15. The light admitting device of the sun tracking type according to claim 12 or 13 or which comprises a control box (50) for housing the drive means (60) and the board (70) therein, one of the board (70) and the control box (50) having circular-arc slots (78*a*) centered about the rotating shaft (66), the board (70) and the control box (50) being adjustable in angle and fixable by means of the slots (78*a*).

16. A light admitting device of the sun tracking type comprising:

a dome (20) made of a light transmitting material, a support frame (34) disposed within the dome and operative to rotate in response to movement of the sun, light reflecting means (30) supported by the support frame (34) within the dome (20) for reflecting sunlight, and drive means (60) suspendedly coupling the support frame (34) for orienting the light reflecting means (30) toward the direction of the sun by rotation of the support frame (34), the light reflecting means (30) including a plurality of reflective panels (31),(32),(33) supported by the support frame (34) and arranged at a predetermined spacing, with the adjacent panels opposed to each other face-to-face, one reflective panel (31) disposed forward and closer to the sun having a lower end positioned at a higher level than lower ends of the other reflective panels (32), (33) disposed rearwardly of the one reflective panel (31).

17. The light admitting device of the sun tracking type according to claim 16 wherein the one reflective panel (31) has an upper end positioned at a lower level than upper ends of the other reflective panels (32),(33).

18. The light admitting device of the sun tracking type according to claim 16 or 17 wherein the reflective panels (31),(32),(33) are arranged as inclined with respect to a horizontal plane, and the one reflective panel (31) has a smaller inclination θ than the other reflective panels (32), (33).

19. The light admitting device of the sun tracking type according to claim 18 wherein the drive means (60) is provided at a top portion of the dome (20), and the support frame (34) supporting the light reflecting means (30) is suspended from and supported by a rotating shaft (66) of the drive means (60).

20. A light admitting device of the sun tracking type comprising:

a dome (20) made of a light transmitting material, drive means (60) disposed at a top portion of the dome (20), and light reflecting means (30) suspended from and supported by the drive means (60) for reflecting sunlight, the light reflecting means (30) being rotatable by the drive means (60) so as to be oriented toward the direction of the sun, the drive means (60) has a rotating shaft (66) rotatable by a motor (62) and supporting a support frame (34) mounting the light reflecting means (30) as suspended from a lower end thereof, the rotating shaft (66) being provided at an upper portion thereof with a board (70) adjustable in angle and fixable within a plane perpendicular to the axis of the rotating shaft (66), the board (70) being provided at an approximate center thereof with angle detecting means (72) engageable with an upper end the rotating shaft (66).

21. The light admitting device of the sun tracking type according to claim 20 wherein the angle detecting means (72) is connected to the rotating shaft (66) by a coupling (80) slidable in directions perpendicular to the axis of the rotating shaft (66).

22. The light admitting device of the sun tracking type according to claim 20 or 21 wherein the angle detecting means (72) is a potentiometer.

23. The light admitting device of the sun tracking type according to claim 22 which comprises a control box (50) for housing the drive means (60) and the board (70) therein, one of the board (70) and the control box (50) having circular-arc slots (78*a*) centered about the rotating shaft (66), the board (70) and the control box (50) being adjustable in angle and fixable by means of the slots (78*a*).

* * * * *